(12) United States Patent
Kaseda et al.

(10) Patent No.: US 12,526,049 B2
(45) Date of Patent: Jan. 13, 2026

(54) OPTICAL TRANSMISSION SYSTEM AND OPTICAL TRANSMISSION METHOD

(71) Applicant: NITTO DENKO CORPORATION, Osaka (JP)

(72) Inventors: Yugo Kaseda, Osaka (JP); Yoshinori Osaki, Osaka (JP); Takeshi Tanaka, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 225 days.

(21) Appl. No.: 18/546,901

(22) PCT Filed: Feb. 24, 2022

(86) PCT No.: PCT/JP2022/007521
§ 371 (c)(1),
(2) Date: Aug. 17, 2023

(87) PCT Pub. No.: WO2022/181665
PCT Pub. Date: Sep. 1, 2022

(65) Prior Publication Data
US 2024/0146412 A1    May 2, 2024

(30) Foreign Application Priority Data
Feb. 24, 2021 (JP) ................. 2021-027965

(51) Int. Cl.
*H04B 10/2507* (2013.01)
*H04B 10/077* (2013.01)
(Continued)

(52) U.S. Cl.
CPC ....... *H04B 10/2507* (2013.01); *H04B 10/077* (2013.01); *H04B 10/40* (2013.01); *H04B 10/516* (2013.01); *H04B 10/60* (2013.01)

(58) Field of Classification Search
None
See application file for complete search history.

(56) References Cited

U.S. PATENT DOCUMENTS 5,355,250 A * 10/1994 Grasso ............... H04B 10/2931
359/341.44
5,550,667 A * 8/1996 Krimmel ............ H04B 10/2537
398/193

(Continued)

FOREIGN PATENT DOCUMENTS

JP    H04-318714 A    11/1992
JP    H10-163974 A    6/1998

(Continued)

OTHER PUBLICATIONS

International Preliminary Report on Patentability issued by WIPO on Aug. 29, 2023, in connection with International Patent Application No. PCT/JP2022/007521.

(Continued)

*Primary Examiner* — Darren E Wolf
(74) *Attorney, Agent, or Firm* — Edwards Neils LLC; Jean C. Edwards, Esq.

(57) ABSTRACT

An optical transmission system converts a first electrical signal into an optical signal, transmits the converted optical signal, and converts the transmitted optical signal into a second electrical signal. The optical transmission system includes an electrooptic conversion device, an optical transmission path, and a photoelectric conversion device. The first electrical signal includes a high-frequency communication signal of above 9 MHz and 10 GHz or less. The optical transmission system further includes an additional signal generating device for generating a low-frequency additional signal having a frequency of 1 Hz or more and 9 MHz or less. The electrooptic conversion device converts the first electrical signal including the additional signal (Continued)

generated in the additional signal generating device and the communication signal into the optical signal.

4 Claims, 1 Drawing Sheet

(51) Int. Cl.
*H04B 10/40* (2013.01)
*H04B 10/516* (2013.01)
*H04B 10/60* (2013.01)

(56) References Cited

U.S. PATENT DOCUMENTS

| | | | |
|---|---|---|---|
| 5,973,812 | A | 10/1999 | Imai et al. |
| 6,271,942 | B1 | 8/2001 | Sasai et al. |
| 7,532,823 | B2 * | 5/2009 | Shimizu ............. H05B 45/18 398/193 |
| 7,580,632 | B1 * | 8/2009 | Feuer ............. H04J 14/0241 398/31 |
| 2001/0038474 | A1 * | 11/2001 | Bradshaw ........ H04B 10/07953 398/155 |
| 2003/0001164 | A1 | 1/2003 | Fujihara et al. |
| 2005/0089334 | A1 * | 4/2005 | Regev ............. H04B 10/672 398/139 |
| 2006/0289730 | A1 | 12/2006 | Niiho et al. |
| 2015/0280833 | A1 * | 10/2015 | Sun ............. H04B 10/65 398/208 |
| 2022/0045756 | A1 | 2/2022 | Tsujita et al. |

FOREIGN PATENT DOCUMENTS

| | | |
|---|---|---|
| JP | H10-215223 A | 8/1998 |
| JP | H11-112432 A | 4/1999 |
| JP | 2001-111497 A | 4/2001 |
| JP | 2003-014992 A | 1/2003 |
| JP | 3579288 B2 | 10/2004 |
| JP | 2007-043672 A | 2/2007 |
| JP | 2007-134842 A | 5/2007 |
| JP | 2012-009577 A | 1/2012 |
| JP | 2016-045443 A | 4/2016 |
| JP | 2020-096363 A | 6/2020 |

OTHER PUBLICATIONS

International Search Report issued in PCT/JP2022/007521 on May 17, 2022.
Written Opinion issued in PCT/JP2022/007521 on May 17, 2022.
Office Action, which was issued by the Japanese Patent Office on Sep. 16, 2025, in connection with Japanese Patent Application No. 2023-502469.

* cited by examiner

OPTICAL TRANSMISSION SYSTEM AND OPTICAL TRANSMISSION METHOD

CROSS-REFERENCE TO RELATED APPLICATIONS

The present application is a 35 U.S.C. 371 National Stage Entry of PCT/JP2022/007521, filed on Feb. 24, 2022, which claims priority from Japanese Patent Application No. 2021-027965, filed on Feb. 24, 2021, the contents of all of which are herein incorporated by reference in their entirety.

TECHNICAL FIELD

The present invention relates to an optical transmission system and an optical transmission method.

BACKGROUND ART

An optical transmission system including a laser chip, an optical fiber, and an optical isolator interposed therebetween is known (ref: for example, Patent Document 1 below). In the optical transmission system described in Patent Document L light emitted from the laser chip is input into the optical fiber after passing through the optical isolator. The optical isolator blocks the light traveling in a reverse direction, while transmitting only the light traveling in a forward direction. Therefore, in the optical transmission system, the optical isolator attenuates the return light from the optical fiber.

CITATION LIST

Patent Document

Patent Document 1: Japanese Unexamined Patent Publication No. 2003-14992

SUMMARY OF THE INVENTION

Problem to be Solved by the Invention

The optical transmission system requires suppression of variations in signal quality with respect to time in accordance with its application and purpose. The signal quality includes CNR (carrier/noise ratio). The signal quality may be also referred to as signal characteristics. The optical transmission system of Patent Document 1 suppresses the above-described variations b the attenuation of the above-described return light by the optical isolator. However, there is a problem that the optical isolator is expensive, and a configuration of the optical transmission system becomes complicated.

The present invention provides a low-cost optical transmission system and an optical transmission method which has a simple configuration, while being capable of suppressing variations in signal quality with respect to time.

Means for Solving Problem

The present invention (1) includes an optical transmission system, converting a first electrical signal into an optical signal, transmitting the converted optical signal, and converting the transmitted optical signal into a second electrical signal, including an electrooptic conversion device converting the first electrical signal into the optical signal, an optical transmission path transmitting the optical signal converted in the electrooptic conversion device, and a photoelectric conversion device converting the optical signal transmitted from the optical transmission path into the second electrical signal, wherein the first electrical signal includes a high-frequency communication signal of above 9 MHz and 10 GHz or less and further includes an additional signal generating device for generating a low-frequency additional signal having a frequency of 1 Hz or more and 9 MHz or less, and the electrooptic conversion device converts the first electrical signal including the additional signal generated in the additional signal generating device and the communication signal into the optical signal.

In the optical transmission system, since the first electrical signal including the low-frequency additional signal which is generated in the additional signal generating device and having the frequency of 1 Hz or more and 9 MHz or less is converted into the optical signal, it is possible to suppress variations in signal quality with respect to time.

Moreover, since the optical transmission system does not need to include the optical isolator as in Patent Document 1, and it is sufficient to include the additional signal generating device for generating the low-frequency additional signal having a specific frequency, its configuration is simple with low cost.

The present invention (2) includes the optical transmission system described in (1), wherein the intensity of the additional signal is 30 dBµV or more.

In the optical transmission system, since the intensity of the additional signal is 30 dBµV or more, it is possible to further more suppress the variations in the signal quality with respect to the time.

The present invention (3) includes the optical transmission system described in (1) or (2) further including a communication signal generating device for generating the communication signal.

The present invention (4) includes an optical transmission method converting a first electrical signal into an optical signal, transmitting the converted optical signal, and converting the transmitted optical signal into a second electrical signal, wherein the first electrical signal includes a high-frequency communication signal of above 9 MHz and 10 GHz or less, wherein the method includes a first step of converting the first electrical signal into the optical signal, a second step of transmitting the optical signal converted in the first step, a third step of converting the optical signal transmitted in the second step into the second electrical signal, and further includes a fourth step of generating a low-frequency additional signal having a frequency of 1 Hz or more and 9 MHz or less; and in the first step, the first electrical signal including the additional signal generated in the fourth step and the communication signal is converted into the optical signal.

In the first step of the optical transmission method, since the first electrical signal including the low-frequency additional signal having the frequency of 1 Hz or more and 9 MHz or less is converted into the optical signal, it is possible to suppress the variations in the signal quality with respect to the time.

Moreover, in the optical transmission method, in the fourth step, since the low-frequency additional signal having a specific frequency is generated, its configuration is simple with low cost.

The present invention (5) includes the optical transmission method described in (4), wherein the intensity of the additional signal is 30 dBµV or more.

In the optical transmission method, since the intensity of the additional signal is 30 dBμV or more, it is possible to further more suppress the variations in the signal quality with respect to the time.

The present invention (6) includes the optical transmission method described in (4) or (5) further including a fifth step of generating the communication signal.

Effect of the Invention

The optical transmission system and the optical transmission method of the present invention have a simple construction with low cost, while being capable of suppressing variations in signal quality with respect to time.

DESCRIPTION OF EMBODIMENTS

<One Embodiment of Optical Transmission System>

Figure 1:
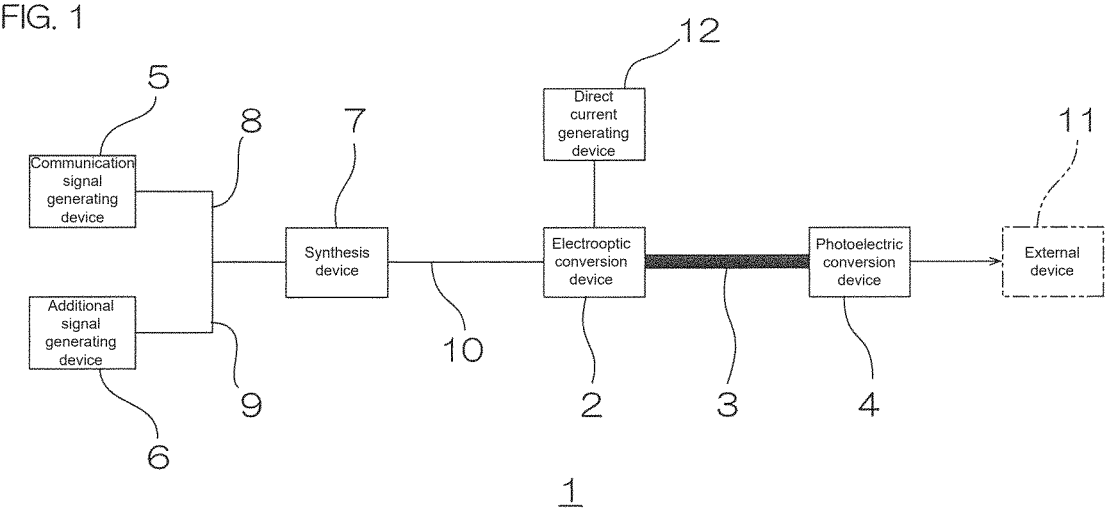
FIG. 1 shows one embodiment of an optical transmission system of the present invention.

One embodiment of an optical transmission system of the present invention is described with reference to FIG. 1. An optical transmission system 1 converts a first electrical signal into an optical signal, transmits the converted optical signal, and converts the transmitted optical signal into a second electrical signal. Hereinafter, each signal is described.

<First Electrical Signal>

In the present invention, the first electrical signal includes an additional signal.

<Additional Signal>

The additional signal is always included in the first electrical signal regardless of the time elapse. That is, the first electrical signal includes the additional signal at any timing.

The additional signal is a low-frequency signal. A frequency of the additional signal is 1 Hz or more and 9 MHz or less. When the frequency of the additional signal is below 1 Hz or above 9 MHz, it is impossible to sufficiently suppress variations in signal quality to be described later. The frequency of the additional signal is preferably 10 Hz or more, more preferably 100 Hz or more, further more preferably 1 kHz or more, particularly preferably 10 kHz or more. Also, the frequency of the additional signal is preferably 1 MHz or less, more preferably 300 kHz or less.

The intensity of the additional signal is, for example, 10.0 dBμV or more, preferably 30.0 dBμV or more, more preferably 75.0 dBμV or more. When the intensity of the additional signal is the above-described lower limit or more, it is possible to further more suppress the variations in the signal quality with respect to the time. On the other hand, an upper limit of the intensity of the additional signal is not limited. The upper limit of the intensity of the additional signal is, for example, 1000 dBμV or 100.0 dBμV.

<Communication Signal>

The first electrical signal further includes a communication signal which includes the information to be communicated. The communication signal is a high-frequency signal. The communication signal is added or superimposed on the above-described additional signal. The additional signal may be referred to as a "non-communication signal" because it does not include the information to be communicated. The communication signal is transmitted in accordance with the elapse of time. That is, there is time when the communication signal is transmitted and time when it is not transmitted. Specifically, in the optical transmission system 1, when the communication signal is not transmitted (at the time of communication signal OFF), the first electrical signal does not include the communication signal, and includes only the additional signal. On the other hand, in the optical transmission system 1, when the communication signal is transmitted (at the time of communication signal ON), the first electrical signal includes the communication signal and the additional signal.

Examples of the communication signal include analog signals and digital signals. Examples of the analogue signal include RF signals. The RF signal includes electromagnetic waves having a frequency band used for radio communications. The RF signal is, for example, transmitted in a frequency division multiplex method. The frequency division multiplex method is a method in which multiple channels are transmitted by multiplexing modulated communication signals in parallel on a frequency axis after carrying out modulation on the communication signals. Examples of the RF signal include multi-wave CW waves (a plurality of single frequency signals) and one-wave CW waves (one single frequency signal). The RF signal and the method described above are, for example, described in Japanese Unexamined Patent Publication No. 2020-096363.

The frequency of the communication signal is, for example, higher than the frequency of the above-described additional signal. The frequency of the communication signal is, for example, above 9 MHz, preferably 10 MHz or more, more preferably 20 MHz or more, further more preferably 50 MHz or more. Further, the frequency of the communication signal is 10 GHz or less.

The intensity of the communication signal is not limited. The intensity of the communication signal is appropriately set in accordance with its application and purpose of the optical transmission system 1.

<Optical Signal and Second Electrical Signal>

The optical signal is a signal obtained by converting the above-described first electrical signal. The second electrical signal is a signal obtained by converting the above-described optical signal. The optical signal and the second electrical signal include at least the above-described additional signal.

<Configuration of Optical Transmission System 1>

As shown in FIG. 1, the optical transmission system 1 includes an electrooptic conversion device 2, an optical transmission path 3, and a photoelectric conversion device 4. Further, the optical transmission system 1 includes a communication signal generating device 5, an additional signal generating device 6, and a synthesis device 7.

<Electrooptic Conversion Device 2>

The electrooptic conversion device 2 is capable of converting the above-described first electrical signal into an optical signal. The electrooptic conversion device 2 is not limited. An example of the electrooptic conversion device 2 includes TOSA. The TOSA is an optical transmission subassembly (Transmitter Optical SubAssembly). The above-described electrooptic conversion device 2 includes, for example, a light source. Examples of the light source include laser diodes. Examples of the laser diode include vertical cavity surface emitting lasers (VCSEL). Further, the electrooptic conversion device 2 is connected to a direct current generating device 12. Examples of the direct current generating device 12 include direct current sources,

Optical Transmission Path 3

The optical transmission path 3 is capable of transmitting the optical signal which is converted in the electrooptic conversion device 2. The optical transmission path 3 extends in a transmission direction. An upstream-side end portion in the transmission direction of the optical transmission path 3 is connected to the electrooptic conversion device 2. The optical transmission path 3 is not limited. Examples of the optical transmission path 3 include optical fibers. Examples of the optical fiber include plastic optical fibers and glass optical fibers. Examples of an embodiment of the optical transmission path 3 include multi-modes and single modes.

Photoelectric Conversion Device 4

The photoelectric conversion device 4 is capable of converting the optical signal transmitted from the optical transmission path 3 into the second electrical signal. The photoelectric conversion device 4 is connected to a downstream-side end portion in the transmission direction of the optical transmission path 3. The photoelectric conversion device 4 is not limited. An example of the photoelectric conversion device 4 includes ROSA. The ROSA is an optical receiver subassembly (Receiver Optical SubAssembly). Further, the above-described photoelectric conversion device 4 includes, for example, a photodiode (PD).

Communication Signal Generating Device 5

The communication signal generating device 5 is capable of generating the above-described communication signal. The communication signal generating device 5 is connected to the electrooptic conversion device 2 via the synthesis device 7 to be described later. A communication line 8 is wired between the communication signal generating device 5 and the synthesis device 7. The communication signal generating device 5 is not limited. Examples of the communication signal generating device 5 include an antenna and an antenna board capable of receiving a RF signal. Examples of the communication signal generating device 5 include multi-signal generating devices.

Additional Signal Generating Device 6

The additional signal generating device 6 is capable of generating the above-described additional signal. The additional signal generating device 6 is connected to the electrooptic conversion device 2 and the communication signal generating device 5 via the synthesis device 7 to be described later. An additional line 9 is wired between the additional signal generating device 6 and the synthesis device 7. The downstream-side portion in the transmission direction of the additional line 9 is in common with the downstream-side portion in the transmission direction of the communication line 8. The additional signal generating device 6 is not limited. Examples of the additional signal generating device 6 include low-frequency signal generating devices. Examples of the low-frequency signal generating device include multi-signal generating devices.

Synthesis Device 7

The synthesis device 7 is capable of synthesizing (superpositioning) the communication signal generated in the communication signal generating device 5 and the additional signal generated in the additional signal generating device 6. The synthesis device 7 is connected to the communication signal generating device 5 via the communication line 8. Further, the synthesis device 7 is connected to the additional signal generating device 6 via the additional line 9. A connection line 10 is wired between the synthesis device 7 and the electrooptic conversion device 2. Therefore, the synthesis device 7 is connected to the electrooptic conversion device 2 via the connection line 10,

Optical Transmission by Optical Transmission System 1 (Optical Transmission Method)

Next, the optical transmission method by the optical transmission system 1 is described.

Operation at Time of Communication Signal OFF

In the optical transmission system 1, the communication signal generating device 5 does not generate a communication signal at all times, that is, has the communication signal OFF. On the other hand, in the optical transmission system 1, the additional signal generating device 6 generates the above-described additional signal at all times. In other words, the fourth step is carried out.

Then, the additional signal generated in the additional signal generating device 6 is input into the electrooptic conversion device 2 via the additional line 9, the synthesis device 7, and the connection line 10. The additional signal is processed to be included in the first electrical signal when passing through the synthesis device 7. That is, the above-described first electrical signal including the additional signal is input into the electrooptic conversion device 2.

The electrooptic conversion device 2 converts the above-described first electrical signal into the optical signal. In other words, the first step is carried out. The electrooptic conversion device 2 converts the first electrical signal including the above-described low-frequency additional signal into light. At that time, the electrooptic conversion device 2 uses the direct current which is input from the direct current generating device 12. Subsequently, the electrooptic conversion device 2 inputs the converted optical signal into the optical transmission path 3.

In the optical transmission path 3, the input optical signal is transmitted to be input into the photoelectric conversion device 4. That is, the second step is carried out. Examples of the transmission method of the optical signal include multi-mode methods and single-mode methods.

The photoelectric conversion device 4 converts the optical signal which is input from the optical transmission path 3 into the second electrical signal. In other words, the third step is carried out. The second electrical signal may be the same or different from the above-described first electrical signal. The second electrical signal is input into an external device 11 which is shown by a virtual line. Examples of the external device 11 include image display devices. Examples of the image display device include televisions and recorders.

Operation at Time of Communication Signal ON

The communication signal generating device 5 generates the communication signal at the time of the communication signal ON. In other words, the fifth step is carried out. Even at this time, in the additional signal generating device 6, the above-described additional signal is continuously generated. In other words, the fourth step is carried out.

The communication signal generated in the communication signal generating device 5 and the additional signal generated in the additional signal generating device 6 are input into the synthesis device 7 via the communication line 8 and the additional line 9, respectively. In the synthesis device 7, the first electrical signal including the communication signal and the additional signal is synthesized from the communication signal and the additional signal. That is, in the synthesis device 7, the additional signal is added (superpositioned) to the communication signal, thereby synthesizing the first electrical signal.

The first electrical signal which is synthesized in the synthesis device 7 is input into the electrooptic conversion device 2 via the connection line 10.

The conversion (first step) from the first electrical signal to the optical signal by the electrooptic conversion device 2 at the time of the communication signal ON, the transmission (second step) of the optical signal by the optical transmission path 3, and the conversion (third step) from the optical signal to the second electrical signal by the photoelectric conversion device 4 are the same as those at the time of the above-described communication signal OFF. However, the first electrical signal in the first step includes the additional signal and the communication <Function and Effect of One Embodiment>

In the optical transmission system 1, since the first electrical signal including the low-frequency additional signal which is generated in the additional signal generating device 6 and having the frequency of 1 Hz or more and 9 MHz or less is converted into the optical signal, it is possible to suppress the variations in the signal quality with respect to the time.

Moreover, since the optical transmission system 1 does not need to include an optical isolator as in Patent Document 1, and it is sufficient to include the additional signal generating device 6 for generating the low-frequency additional signal having a specific frequency, its configuration is simple with low cost.

In the optical transmission system 1, when the intensity of the additional signal is 30 dBµV or more, it is possible to further more suppress the variations in the signal quality with respect to the time.

In the first step of the optical transmission method of one embodiment, since the first electrical signal including the low-frequency additional signal having the frequency of 1 Hz or more and 9 MHz or less is converted into the optical signal, it is possible to suppress the variations in the signal quality with respect to the time.

Moreover, in the optical transmission method, in the fourth step, since the low-frequency additional signal having a specific frequency is generated, its configuration is simple with lose cost.

In the optical transmission method, since the intensity of the additional signal is 30 dBµV or more, it is possible to further more suppress the variations in the signal quality with respect to the time.

MODIFIED EXAMPLES

In each modified example, the same reference numerals are provided for members and steps corresponding to each of those in one embodiment, and their detailed description is omitted. Further, each modified example can achieve the same function and effect as that of one embodiment unless otherwise specified. Furthermore, one embodiment and each modified example can be appropriately used in combination.

Figure 2:
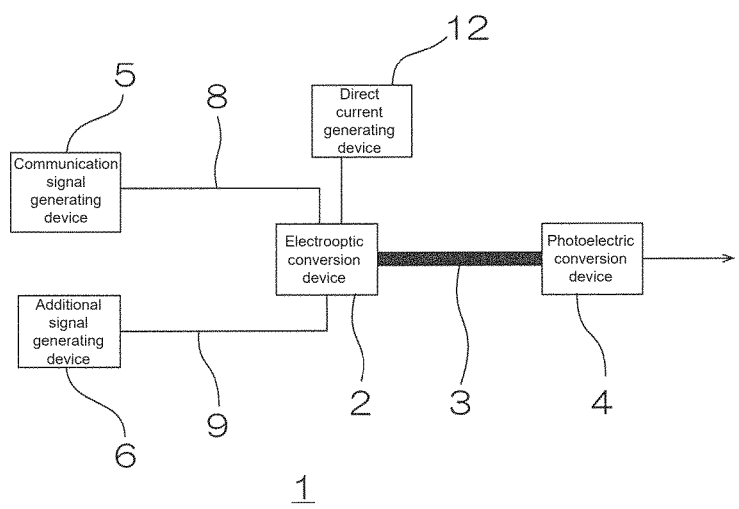
FIG. 2 shows an optical transmission system of a modified example.

As shown in FIG. 2, the optical transmission system 1 does not separately include the synthesis device 7, and the electrooptic conversion device 2 is provided with a function of the synthesis device 7. That is, the electrooptic conversion device 2 also serves as a synthetic device. The communication signal generating device 5 is connected to the electrooptic conversion device 2 via the communication line 8. The additional signal generating device 6 is connected to the electrooptic conversion device 2 via the additional line 9.

Figure 3:
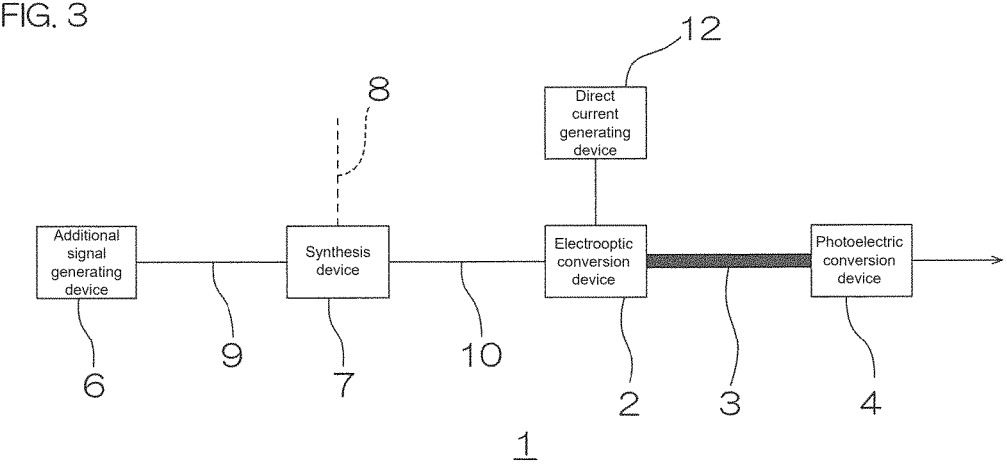
FIG. 3 shows an optical transmission system of a modified example.

As shown in FIG. 3, the optical transmission system 1 may not include the communication signal generating device 5. In the modified example of FIG. 3, in the synthesis device 7, the communication signal is input from outside via the communication line 8 shown by the virtual line. In the synthesis device 7, the above-described first electrical signal is synthesized from the above-described communication signal and the additional signal input from the additional signal generating device 6.

EXAMPLES

Next, the present invention is further described based on Examples and Comparative Examples. The present invention is however not limited by these Examples and Comparative Examples. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

Examples 1 to 5 and Comparative Examples 1 to 2

<Frequency of 100 MHz of High-Frequency Signal, Intensity of 80 dBµV>

Example 1

The optical transmission system 1 including the following device shown in FIG. 1 was prepared as Example 1.

Electrooptic conversion device 2: TOSA using VCSEL having a central wavelength of 850 nm
    Optical transmission path 3: multi-mode optical fiber
    Photoelectric conversion device 4: ROSA using PD
    Communication signal generating device 5: model number of N5183A, multi-signal generator manufactured by Agilent Technologies
    Additional signal generating device 6: model number of WF1973, multi-signal generator manufactured by NF Corporation
    External device 11: model number of N9010B, spectral analyzer manufactured by Keysight Technologies
    Direct current generating device 12: model number of 2400, source meter, and a direct current source manufactured by Keithley Instruments In Example 1, the communication signal generating device 5 generated a high-frequency signal having the frequency of 100 MHz as a one-wave CW wave and the intensity of 80 dBµV. At the same time, the direct current of 8 mA was input from the direct current generating device 12 into the electrooptic conversion device 2, and the additional signal generating device 6 generated an additional signal having the frequency of 1 kHz and the intensity of 85.0 dBµV Subsequently, the variations in the quality of the second electrical signal in the photoelectric conversion device 4 were measured with the external device 11 for 30 minutes. The variations were determined as a difference between the maximum value and the minimum value of the signal quality measured with the external device 11. The results are shown in Table 1.

Example 2

The variations were measured in the same manner as in Example 1. However, the frequency of the additional signal was changed from 1 kHz to 10 kHz. The results of the variations are shown in Table 1.

Example 3

The variations were measured in the same manner as in Example 1. However, the frequency of the additional signal was changed from 1 kHz to 100 kHz. The results of the variations are shown in Tables 1 and 2.

Example 4

The variations were measured in the same manner as in Example 1. However, the frequency of the additional signal was changed from 1 kHz to 200 kHz. The results of the variations are shown in Table 1.

Example 5

The variations were measured in the same manner as in Example 1. However, the frequency of the additional signal was changed from 1 kHz to 500 kHz. The results of the variations are shown in Table 1.

Comparative Example 1

The variations were measured in the same manner as in Example 1. However, the frequency of the additional signal was changed from 1 kHz to 10 MHz.

Comparative Example 2

The variations were measured in the same manner as in Example 1. However, the additional signal was not generated in the additional signal generating device 6. The results of the variations are shown in Table 1.

Examples 6 to 12

<Frequency of 100 MHz of High-Frequency Signal>

Example 6

The variations were measured in the same manner as in Example 3. However, in the additional signal generating device 6, the intensity of the additional signal was changed from 85.0 dBµV to 10.0 dBµV. The results of the variations are shown in Table 2.

Example 7

The variations were measured in the same manner as in Example 3. However, in the additional signal generating device 6, the intensity of the additional signal was changed from 85.0 dBµV to 30.0 dBµV. The results of the variations are shown in Table 2.

Example 8

The variations were measured in the same manner as in Example 3. However, in the additional signal generating device 6, the intensity of the additional signal was changed from 85.0 dBµV to 50.0 dBµV. The results of the variations are shown in Table 2.

Example 9

The variations were measured in the same manner as in Example 3. However, in the additional signal generating device 6, the intensity of the additional signal was changed from 85.0 dBµV to 70.0 dBµV. The results of the variations are shown in Table 2.

Example 10

The variations were measured in the same manner as in Example 3. However, in the additional signal generating device 6, the intensity of the additional signal was changed from 85.0 dBµV to 80.0 dBµV. The results of the variations are shown in Table 2.

Example 11

The variations were measured in the same manner as in Example 3. However, in the additional signal generating device 6, the intensity of the additional signal was changed from 85.0 dBµV to 90.0 dBµV. The results of the variations are shown in Table 2.

Example 12

The variations were measured in the same manner as in Example 3. However, in the additional signal generating device 6, the intensity of the additional signal was changed from 85.0 dBµV to 100.0 dBµV. The results of the variations are shown in Table 2.

Example 13

In Example 13, 8 mA of direct current was generated from the direct current generating device 12. Further, the additional signal generating device 6 generated an additional signal having the frequency of 10 kHz and the intensity of 85 dBµV. However, the communication signal was not generated in the communication signal generating device 5. Subsequently, the variations of the second electrical signal in the photoelectric conversion device 4 were measured with the extremal device 11 for 30 minutes. The variations were determined as a difference between the maximum value and the minimum value of the noise intensity at 100 MHz measured with the extremal device 11. The results are shown in Table 3.

Thereafter, the variations were measured. The results of the variations are shown in Table 3.

Comparative Example 3

The variations were measured in the same manner as in Example 13. However, the additional signal was not generated in the additional signal generating device 6. That is, the communication signal was not generated in the communication signal generating device 5, and the additional signal was not generated also in the additional signal generating device 6. Subsequently, the variations of the second electrical signal in the photoelectric conversion device 4 were measured with the external device 11 for 30 minutes. The variations were determined as a difference between the maximum value and the minimum value of the noise intensity at 100 MHz measured with the extremal device 11. The results are shown in Table 3.

Examples 14 to 18 and Comparative Examples 4 to 8

<Frequency of 1 kHz of Additional Signal, Intensity of 70 dBµV>

The variations were measured in the same manner as in Example 1. However, the intensity of the additional signal was changed from 85.0 dBµV to 70.0 dBµV. Then, as shown in Table 4, the frequency of the high-frequency signal which was the communication signal was changed. In Comparative Examples 4 to 8, the additional signal was not generated in the additional signal generating device 6. The results are shown in Table 4.

Example 14

The frequency of the high-frequency signal was set at 50 MHz.

Example 15

The frequency of the high-frequency signal was set at 100 MHz.

Example 16

The frequency of the high-frequency signal was set at 1 GHz.

Example 17

The frequency of the high-frequency signal was set at 5 GHz.

Example 18

The frequency of the high-frequency signal was set at 10 GHz.

Comparative Example 4

The additional signal was not generated in the additional signal generating device 6, and the frequency of the high-frequency signal was set at 50 MHz.

Comparative Example 5

The additional signal was not generated in the additional signal generating device 6, and the frequency of the high-frequency signal was set at 100 MHz.

Comparative Example 6

The additional signal was not generated in the additional signal generating device 6, and the frequency of the high-frequency signal was set at 1 GHz.

Comparative Example 7

The additional signal was not generated in the additional signal generating device 6, and the frequency of the high-frequency signal was set at 5 GHz.

Comparative Example 8

The additional signal was not generated in the additional signal generating device 6, and the frequency of the high-frequency signal was set at 10 GHz.

Examples 19 to 23 and Comparative Examples 9 to 13

<Frequency of 10 kHz of Additional Signal, Intensity of 70 dBµV>

The variations were measured in the same manner as in Example 1. However, the frequency of the additional signal was changed from 1 kHz to 10 kHz. Then, the intensity of the additional signal was changed from 85.0 dBµV to 70.0 dBµV. Then, as shown in Table 5, the frequency of the high-frequency signal which was the communication signal was changed. In Comparative Examples 9 to 13, the additional signal was not generated in the additional signal generating device 6. The results are shown in Table 5.

Example 19

The frequency of the high-frequency signal was set at 50 MHz.

Example 20

The frequency of the high-frequency signal was set at 100 MHz.

Example 21

The frequency of the high-frequency signal was set at 1 GHz.

Example 22

The frequency of the high-frequency signal was set at 5 GHz.

Example 23

The frequency of the high-frequency signal was set at 10 GHz.

Comparative Example 9

The additional signal was not generated in the additional signal generating device 6, and the frequency of the high-frequency signal was set at 50 MHz.

Comparative Example 10

The additional signal was not generated in the additional signal generating device 6, and the frequency of the high-frequency signal was set at 100 MHz.

Comparative Example 11

The additional signal was not generated in the additional signal generating device 6, and the frequency of the high-frequency signal was set at 1 GHz.

Comparative Example 12

The additional signal was not generated in the additional signal generating device 6, and the frequency of the high-frequency signal was set at 5 GHz.

Comparative Example 13

The additional signal was not generated in the additional signal generating device 6, and the frequency of the high-frequency signal was set at 10 GHz.

Examples 24 to 28 and Comparative Examples 14 to 18

<Frequency of 100 kHz of Additional Signal, Intensity of 70 dBµV>

The variations were measured in the same manner as in Example 1. However, the frequency of the additional signal was changed from 1 kHz to 100 kHz. Then, the intensity of the additional signal was changed from 85.0 dBµV to 70.0 dBµV. Then, as shown in Table 6, the frequency of the high-frequency signal which was the communication signal was changed. In Comparative Examples 14 to 18, the additional signal was not generated in the additional signal generating device 6. The results are shown in Table 6.

Example 24

The frequency of the high-frequency signal was set at 50 MHz.

Example 25

The frequency of the high-frequency signal was set at 100 MHz.

Example 26

The frequency of the high-frequency signal was set at 1 GHz.

Example 27

The frequency of the high-frequency signal was set at 5 GHz.

Example 28

The frequency of the high-frequency signal was set at 10 GHz.

Comparative Example 14

The additional signal was not generated in the additional signal generating device 6, and the frequency of the high-frequency signal was set at 50 MHz.

Comparative Example 15

The additional signal was not generated in the additional signal generating device 6, and the frequency of the high-frequency signal was set at 100 MHz.

Comparative Example 16

The additional signal was not generated in the additional signal generating device 6, and the frequency of the high-frequency signal was set at 1 GHz.

Comparative Example 17

The additional signal was not generated in the additional signal generating device 6, and the frequency of the high-frequency signal was set at 5 GHz.

Comparative Example 18

The additional signal was not generated in the additional signal generating device 6, and the frequency of the high-frequency signal was set at 10 GHz.

Examples 29 to 33 and Comparative Examples 19 to 23

<Frequency of 300 kHz of Additional Signal, Intensity of 70 dBµV>

The variations were measured in the same manner as in Example 1. However, the frequency of the additional signal was changed from 1 kHz to 300 kHz. Then, the intensity of the additional signal was changed from 85.0 dBµV to 70.0 dBµV. Then, as shown in Table 7, the frequency of the high-frequency signal which was the communication signal was changed. In Comparative Examples 19 to 23, the additional signal was not generated in the additional signal generating device 6. The results are shown in Table 7.

Example 29

The frequency of the high-frequency signal was set at 50 MHz.

Example 30

The frequency of the high-frequency signal was set at 100 MHz.

Example 31

The frequency of the high-frequency signal was set at 1 GHz.

Example 32

The frequency of the high-frequency signal was set at 5 GHz.

Example 33

The frequency of the high-frequency signal was set at 10 GHz.

Comparative Example 19

The additional signal was not generated in the additional signal generating device 6, and the frequency of the high-frequency signal was set at 50 MHz.

Comparative Example 20

The additional signal was not generated in the additional signal generating device 6, and the frequency of the high-frequency signal was set at 100 MHz.

Comparative Example 21

The additional signal was not generated in the additional signal generating device 6, and the frequency of the high-frequency signal was set at 1 GHz.

Comparative Example 22

The additional signal was not generated in the additional signal generating device 6, and the frequency of the high-frequency signal was set at 5 GHz.

Comparative Example 23

The additional signal was not generated in the additional signal generating device 6, and the frequency of the high-frequency signal was set at 10 GHz.

Example 34 and Comparative Example 24

<Frequency of 500 kHz of Additional Signal. Intensity of 81.5 dBµV>

The variations were measured in the same manner as in Example 1. However, the frequency of the additional signal was changed from 1 kHz to 500 kHz. Then, the intensity of the additional signal was changed from 85.0 dBμV to 81.5 dBμV. Then, as shown in Table 8, the frequency of the high-frequency signal which was the communication signal was changed. In Comparative Example 24, the additional signal was not generated in the additional signal generating device 6. The results are shown in Table 8.

Example 34

The frequency of the high-frequency signal was set at 5 GHz.

Comparative Example 24

The additional signal was not generated in the additional signal generating device 6, and the frequency of the high-frequency signal was set at 5 GHz.

Example 35 and Comparative Example 25

<Frequency of 10 MHz of Additional Signal, Intensity of 81.5 dBμV>
The variations were measured in the same manner as in Example 1. However, the frequency of the additional signal was changed from 1 kHz to 10 MHz. The intensity of the additional signal was changed from 85.0 dBμV to 90.0 dBμV. Then, as shown in Table 9, the frequency of the high-frequency signal which was the communication signal was changed. In Comparative Example 25, the additional signal was not generated in the additional signal generating device 6. The results are shown in Table 9.

Example 35

The frequency of the high-frequency signal was set at 5 GHz.

Comparative Example 25

The additional signal was not generated in the additional signal generating device 6, and the frequency of the high-frequency signal was set at 5 GHz.

TABLE 1

|  | Frequency of Additional Signal | Variation (dB) |
|---|---|---|
| Ex. 1 | 1 kHz | 3.4 |
| Ex. 2 | 10 kHz | 1.9 |
| Ex. 3 | 100 kHz | 2.8 |
| Ex. 4 | 200 kHz | 2.2 |
| Ex. 5 | 500 kHz | 5.5 |
| Comparative Ex. 1 | 10 MHz | 6.2 |
| Comparative Ex. 2 | —*1 | 6.6 |

*1 No additional Signal

TABLE 2

|  | Intensity (dBμV) of Additional Signal | Variation (dB) |
|---|---|---|
| Ex. 6 | 10.0 | 6.1 |
| Ex. 7 | 30.0 | 6.0 |
| Ex. 8 | 50.0 | 5.9 |
| Ex. 9 | 70.0 | 5.6 |
| Ex. 10 | 80.0 | 3.2 |
| Ex. 3 | 85.0 | 2.8 |
| Ex. 11 | 90.0 | 2.1 |
| Ex. 12 | 100.0 | 2.3 |

TABLE 3

|  | Additional Signal | Variation (dB) |
|---|---|---|
| Ex. 13 | Presence | 2 |
| Comparative Ex. 3 | Absence | 6 |

TABLE 4

|  | Frequency of High-Frequency Signal (Communication Signal) | | | | |
|---|---|---|---|---|---|
|  | 50 MHz | 100 MHz | 1 GHz | 5 GHz | 10 GHz |
| Presence of Additional Signal *1 | Ex. 14 | Ex. 15 | Ex. 16 | Ex. 17 | Ex. 18 |
| Variation (dB) | 2.0 | 1.7 | 1.1 | 0.6 | 0.7 |
| Absence of Additional Signal | Comparative Ex. 4 | Comparative Ex. 5 | Comparative Ex. 6 | Comparative Ex. 7 | Comparative Ex. 8 |
| Variation (dB) | 7.0 | 6.6 | 3.9 | 1.7 | 0.8 |

*1 Frequency of 1 kHz of Additional Signal, Intensity of 70 dBμV

TABLE 5

|  | Frequency of High-Frequency Signal (Communication Signal) | | | | |
|---|---|---|---|---|---|
|  | 50 MHz | 100 MHz | 1 GHz | 5 GHz | 10 GHz |
| Presence of Additional Signal *1 | Ex. 19 | Ex. 20 | Ex. 21 | Ex. 22 | Ex. 23 |
| Variation (dB) | 3.3 | 2.8 | 2.1 | 0.9 | 0.3 |
| Absence of Additional Signal | Comparative Ex. 9 | Comparative Ex. 10 | Comparative Ex. 11 | Comparative Ex. 12 | Comparative Ex. 13 |
| Variation (dB) | 4.9 | 6.6 | 3.7 | 2.7 | 2.8 |

*1 Frequency of 10 kHz of Additional Signal, Intensity of 70 dBμV

TABLE 6

|  | Frequency of High-Frequency Signal (Communication Signal) | | | | |
|---|---|---|---|---|---|
|  | 50 MHz | 100 MHz | 1 GHz | 5 GHz | 10 GHz |
| Presence of Additional Signal *1 | Ex. 24 | Ex. 25 | Ex. 26 | Ex. 27 | Ex. 28 |
| Variation (dB) | 3.9 | 5.6 | 1.7 | 2.4 | 2.7 |

TABLE 6-continued

| | Frequency of High-Frequency Signal (Communication Signal) | | | | |
|---|---|---|---|---|---|
| | 50 MHz | 100 MHz | 1 GHz | 5 GHz | 10 GHz |
| Absence of Additional Signal Variation (dB) | Comparative Ex. 14 4.9 | Comparative Ex. 15 6.6 | Comparative Ex. 16 2.9 | Comparative Ex. 17 2.7 | Comparative Ex. 18 2.8 |

*[1] Frequency of 100 kHz of Additional Signal, Intensity of 70 dBµV

TABLE 7

| | Frequency of High-Frequency Signal (Communication Signal) | | | | |
|---|---|---|---|---|---|
| | 50 MHz | 100 MHz | 1 GHz | 5 GHz | 10 GHz |
| Presence of Additional Signal *[1] Variation (dB) | Ex. 29 4.2 | Ex. 30 4.7 | Ex. 31 2.8 | Ex. 32 0.8 | Ex. 33 0.5 |
| Absence of Additional Signal Variation (dB) | Comparative Ex. 19 4.9 | Comparative Ex. 20 6.6 | Comparative Ex. 21 3.7 | Comparative Ex. 22 2.7 | Comparative Ex. 23 2.8 |

*[1] Frequency of 300 kHz of Additional Signal, Intensity of 70 dBµV

TABLE 8

| | Frequency of High-Frequency Signal (Communication Signal) 5 GHz |
|---|---|
| Presence of Additional Signal *[1] Variation (dB) | Ex. 34 1.3 |
| Absence of Additional Signal Variation (dB) | Comparative Ex. 24 2.0 |

*[1] Frequency of 500 kHz of Additional Signal, Intensity of 81.5 dBµV

TABLE 9

| | Frequency of High-Frequency Signal (Communication Signal) 5 GHz |
|---|---|
| Presence of Additional Signal *[1] Variation (dB) | Ex. 35 1.9 |
| Absence of Additional Signal Variation (dB) | Comparative Ex. 25 2.0 |

*[1] Frequency of 10 MHz of Additional Signal, Intensity of 90 dBµV

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICATION

The optical transmission system of the present invention is used for transmission of an electrical signal using light.

DESCRIPTION OF REFERENCE NUMERALS

1 Optical transmission system
2 Electrooptic conversion device
3 Optical transmission path
4 Photoelectric conversion device
5 Communication signal generating device
6 Additional signal generating device

The invention claimed is:

1. An optical transmission system, converting a first electrical signal into an optical signal, transmitting the converted optical signal, and converting the transmitted optical signal into a second electrical signal, comprising:
    an electrooptic conversion device converting the first electrical signal into the optical signal,
    an optical transmission path transmitting the optical signal converted in the electrooptic conversion device, and
    a photoelectric conversion device converting the optical signal transmitted from the optical transmission path into the second signal, wherein
    the first electrical signal includes a high-frequency communication signal of above 9 MHz and 10 GHz or less and
    further includes an additional signal generating device for generating a low-frequency additional signal having a frequency of 1 Hz or more and 9 MHz or less,
    the electrooptic conversion device converts the first electrical signal including the additional signal generated in the additional signal generating device and the communication signal into the optical signal,
    the intensity of the additional signal is 30 dBµV or more, and
    the additional signal suppresses variations in signal quality with respect to time.

2. The optical transmission system according to claim 1 further comprising:
    a communication signal generating device for generating the communication signal.

3. An optical transmission method converting a first electrical signal into an optical signal, transmitting the converted optical signal, and converting the transmitted optical signal into a second electrical signal, wherein
    the first electrical signal includes a high-frequency communication signal of above 9 MHz and 10 GHz or less, wherein
    the method includes a first step of converting the first electrical signal into the optical signal,
    a second step of transmitting the optical signal converted in the first step,
    a third step of converting the optical signal transmitted in the second step into the second electrical signal, and
    further includes a fourth step of generating a low-frequency additional signal having a frequency of 1 Hz or more and 9 MHz or less; and
    in the first step, the first electrical signal including the additional signal generated in the fourth step and the communication signal is converted into the optical signal, wherein
    the intensity of the additional signal is 30 dBµV or more, and
    the additional signal suppresses variations in signal quality with respect to time.

4. The optical transmission method according to claim 3 further comprising:
    a fifth step of generating the communication signal.

* * * * *